(12) United States Patent
Crocker et al.

(10) Patent No.: US 11,288,325 B1
(45) Date of Patent: Mar. 29, 2022

(54) DATA ACCESS OPTIMIZATION IN DISTRIBUTED DATABASE

(71) Applicant: New Relic, Inc., San Francisco, CA (US)

(72) Inventors: Ronald Thomas Crocker, Fairview, OR (US); Jonathan Brian Owens, Portland, OR (US); Joshua Tyler Galbraith, Portland, OR (US)

(73) Assignee: New Relic, Inc., San Francisco, CA (US)

( * ) Notice: Subject to any disclaimer, the term of this patent is extended or adjusted under 35 U.S.C. 154(b) by 0 days.

(21) Appl. No.: 17/037,471

(22) Filed: Sep. 29, 2020

(51) Int. Cl.
| | |
|---|---|
| G06F 16/00 | (2019.01) |
| G06F 16/906 | (2019.01) |
| G06F 16/27 | (2019.01) |
| G06F 16/901 | (2019.01) |
| G06F 7/72 | (2006.01) |
| G06F 16/9032 | (2019.01) |
| G06F 16/22 | (2019.01) |
| G06F 16/2458 | (2019.01) |
| G06F 9/50 | (2006.01) |

(52) U.S. Cl.
CPC ............. *G06F 16/906* (2019.01); *G06F 7/72* (2013.01); *G06F 16/2282* (2019.01); *G06F 16/2477* (2019.01); *G06F 16/278* (2019.01); *G06F 16/9014* (2019.01); *G06F 16/90328* (2019.01); *G06F 9/5083* (2013.01)

(58) Field of Classification Search
CPC ............. G06F 16/2282; G06F 16/2477; G06F 16/278; G06F 16/9014; G06F 16/90328; G06F 16/906; G06F 7/72; G06F 9/5083
See application file for complete search history.

(56) References Cited

U.S. PATENT DOCUMENTS

| | | | | |
|---|---|---|---|---|
| 2007/0204061 | A1* | 8/2007 | Chen | ..................... H04L 67/104 709/238 |
| 2011/0252192 | A1* | 10/2011 | Busch | ................... G06F 3/0685 711/105 |
| 2013/0332484 | A1* | 12/2013 | Gajic | ...................... G06F 16/20 707/770 |
| 2016/0191509 | A1* | 6/2016 | Bestler | ................ G06F 12/1408 713/163 |
| 2018/0203915 | A1* | 7/2018 | Marshall | ............... G06F 16/355 |
| 2019/0102418 | A1* | 4/2019 | Vasudevan | .......... G06F 16/2358 |

\* cited by examiner

Primary Examiner — Diedra McQuitery
(74) Attorney, Agent, or Firm — Fenwick & West LLP

(57) ABSTRACT

A distributed database receives an instruction to read or write data. The instruction includes a key. The database includes a key space defined by attoshards. An attoshard is a segment of key space having a size, in keys, proportional to a total number of nodes in the database. The attoshard includes keys for cluster segments at predefined positions in the attoshard. Each cluster segment corresponds to one cluster. A node of the database hashes the key to generate a token. The node performs a modulo operation on the token using the total number of nodes in the database to compute a remainder value. The node determines a cluster segment of an attoshard based on a position in the attoshard defined by the remainder value. The node determines a cluster for the instruction based on the cluster segment and executes the instruction at the determined cluster.

20 Claims, 5 Drawing Sheets

Cluster set 120

DATA ACCESS OPTIMIZATION IN DISTRIBUTED DATABASE

TECHNICAL FIELD

The disclosure relates generally to the field of distributed databases and in particular to the field of reading and writing data using distributed databases.

BACKGROUND

Many modern software applications are built using distributed software architectures rather than traditional monolithic paradigms. These applications can include distributed databases where the database is spread among nodes, e.g., server devices, arranged in a cluster of nodes. For example, a software application may implement a distributed database using APACHE CASSANDRA, a non-relational database management system that operates upon a cluster of independent but interconnected nodes. The cluster is scalable and nodes can be decommissioned or bootstrapped without taking the distributed database out of its production environment. This may be done, for example, when more data storage capacity is needed, or to increase the capacity of the distributed database to respond to increased operational demands.

Computing devices can interact with the distributed database by communicating with any node in the cluster (e.g., using the Cassandra Query Language, "CQL"). The node coordinates with other nodes in the cluster to perform operations specified by the computing device, such as read and write operations. Increased inter-node communications can increase lag, causing the distributed database to decline in performance from the perspective of the computing device. As such, lessening inter-node communication can contribute to optimizing distributed database performance.

Distributed databases use consistent hashing to distribute data among nodes. Consistent hashing involves the cluster maintaining a consistent key for a piece of data. A hash of the consistent key produces a token, which is used to determine a node to store the piece of data. When the number of nodes in the cluster changes, consistent hashing involves changing the node that serves the piece of data based on a new mapping of the token to a node in view of the changed number of nodes. The data is moved from the original node to the new node indicated by the token. This rearranging of data can make it computationally inefficient and time consuming to scale a cluster, so much so that incremental scaling is rarely viable as an efficient scaling technique.

SUMMARY

In an embodiment, a computer-implemented method for querying a database includes receiving an instruction to write or read data, the instruction comprising a key specifying a location for the data within the database, the database including a keyspace defined by attoshards, each attoshard being a segment of the keyspace having a size, in keys, proportional to a total number of nodes in the database, each attoshard comprising keys for a plurality of cluster segments at predefined positions within the attoshard, each cluster segment corresponding to one cluster of the plurality of clusters. The computer-implemented method further includes hashing the key to generate a token. The computer-implemented method further includes performing a modulo operation on the token using the total number of nodes in the database to compute a remainder value. The computer-implemented method further includes determining a cluster segment of an attoshard based on a position in the attoshard defined by the remainder value. The computer-implemented method further includes determining a cluster of the set of clusters for the instruction corresponding to the determined cluster segment. The computer-implemented method further includes Executing the instruction to write or read the data at the determined cluster.

BRIEF DESCRIPTION OF THE DRAWINGS

Figure (FIG. 1 is a block diagram illustrating a system for performing operations with a distributed database, according to one embodiment.

Figure 1:
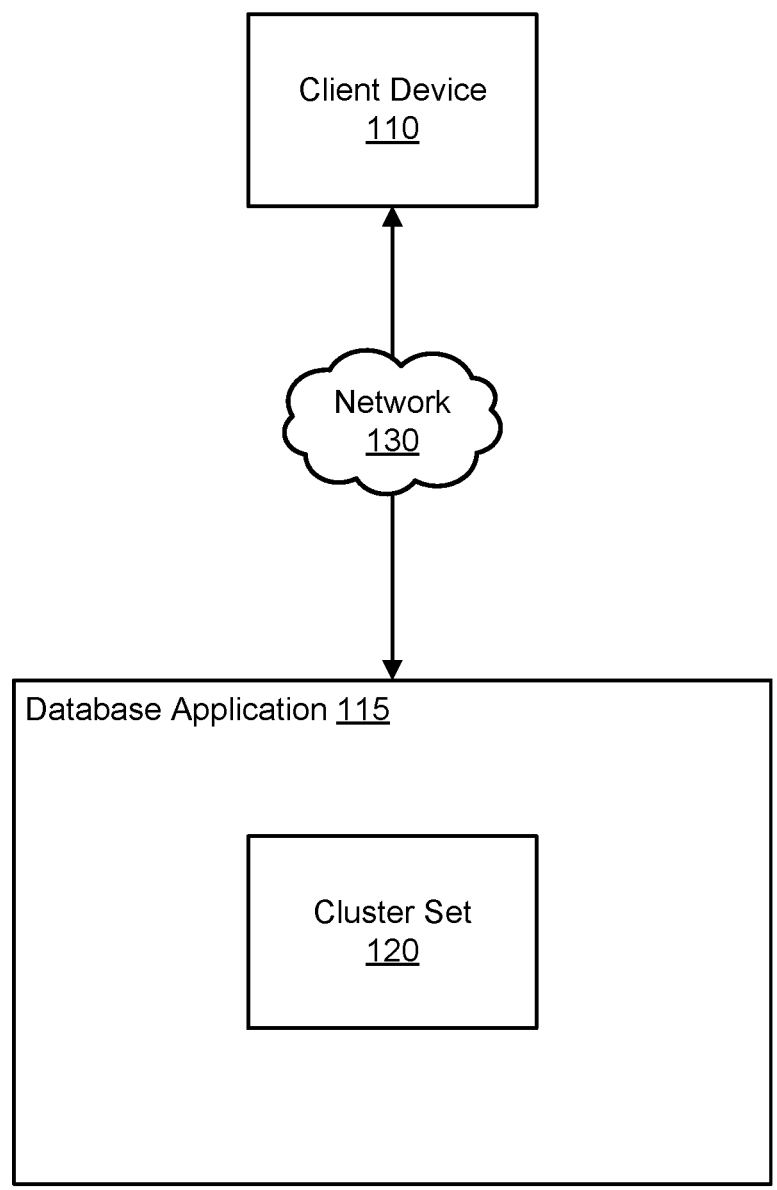

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. General Overview

The scaling problems associated with a cluster employing consistent hashing to distribute data among nodes can be improved by implementing the distributed database as a set of clusters (a "cluster set"), with each cluster including nodes. Scaling the cluster set involves either scaling an individual cluster (e.g., adding or removing nodes), or by adding or removing a cluster from the cluster set. This limits data redistribution to a subset of the distributed database.

In an embodiment, writing data to the cluster set involves writing the data to an individual cluster in the cluster set in a weighted random fashion, with weights proportional to the relative sizes of the clusters. Reading data from the cluster set then involves reading from each of the clusters in the cluster set because the location of the data is unknown due to its random placement in one of the clusters. In this embodiment, write operations handled by each cluster scale proportionally with the relative size of the cluster due to the weighted random distribution of writes, but reads do not likewise scale.

As the cluster set upscales, read operations at each cluster are disproportionate to the amount of data stored at the cluster. Smaller clusters see relatively more read load than larger clusters. In this embodiment, these read operations cannot be avoided because the data may be in any of the clusters, so each must be checked. As the number of clusters in the cluster set increases, the read load grows on each cluster while the number of writes and the relative portion of the data stored in those clusters both decrease. Therefore, reading from the cluster set becomes increasingly inefficient as the cluster set grows, with more and more misses. Reading from more clusters also increases the likelihood of a slow node in one of the clusters increasing read time.

In a second embodiment, to optimize the read operation upon a cluster set, the entire key range is apportioned among the clusters in the cluster set such that any given key is written to a specific cluster. In this manner the keys are proportionally distributed among the clusters. As each key corresponds to a particular cluster, read operations may be targeted to that cluster rather than sent to every cluster in the cluster set, optimizing the read operation. Uniform distributions of keys provide proportional load for read operations, alleviating the former performance penalty to read operations due to cluster set growth. Thus, the distributed database has proportional loads among the clusters for both write operations and read operations.

A distributed database may be implemented as a cluster set including multiple clusters of nodes. When a read operation is received by the distributed database, the distributed database identifies a key in the read operation, e.g., a primary key specifying the data to be read.

The key may be an integer value from a range of possible values, i.e., the key space. The key space is divided into "attoshards" which are small segments of keys within the range of possible values. Each attoshard is itself partitioned into cluster segments, where each cluster segment corresponds to a cluster in the cluster set and has a size, in keys, equal to the number of nodes in the cluster.

The order of assignment of cluster segments within the attoshard is consistent across all attoshards. Thus, the key space is apportioned among the clusters in the cluster set at a granularity that enables data to be spread both across the key space and the cluster set and at a proportionality such that the total number of keys associated with a particular cluster is proportional to its size in nodes. This creates an environment for read and write operations where the reads and writes per cluster are functionally proportional to the size of the cluster, in nodes, with respect to the other clusters of the cluster set. As such, read time is decreased in comparison to embodiments that do not involve attosharding the key space.

II. System Overview

FIG. 1 is a block diagram illustrating a system 100 for performing operations with a distributed database, according to one embodiment. The system 100 includes a client device 110 and a database application 115 connected over a network 130. The database application 115 includes a cluster set 120 having multiple clusters of nodes collectively serving a distributed database.

The client device 110 is a personal computer, laptop, mobile device, or other computing device. The client device 110 accesses the database application 115 over the network 130 and can manage the database application 115, e.g., send instructions to the database application 115 to control the configuration of and/or alter the data in the cluster set 120. For example, the client device 110 may send instructions to the database application 115 using CQL or another query language to perform one or more read operations and/or one or more write operations upon the distributed database served by the cluster set 120. In an embodiment, the client device 110 can send instructions to the database application 115 to alter the configuration of the cluster set 120. For example, the client device 110 can send instructions to the database application 115 to increase or decrease the number of clusters, or to increase or decrease the number of nodes within one or more particular clusters. In some embodiments, the system 100 includes more than one client device 110, which can each send some or all instructions to the database application 115.

The database application 115 is a system serving a software application operating upon one or more computing devices, e.g., a server remote from the client 110 that runs a software application accessible by the client 110. The database application 115 includes the cluster set 120. The cluster set 120 comprises a set of clusters, each cluster including nodes. The clusters of nodes in the cluster set 120 may vary in size or may each have the same number of nodes.

A node is a computing device serving a portion of the distributed database. As a specific example, the node is a computing device running an instance of APACHE CASSANDRA implemented as part of the database application 115. The node stores, in a non-transitory computer-readable medium, data of the distributed database (e.g., data written to the distributed database by the client device 110). The node coordinates with other nodes to serve the distributed database. Each node is associated with a set of tokens, such as a range of token values within a token ring. Upon receiving an operation for performance upon the distributed database, the node applies a consistent hash function to a key included in the operation to produce a token. The node uses the token to identify a node that stores the data for performance of the operation.

The hash function used by the node to hash keys is common to all the nodes. A hash of a particular key by one node will produce the same token as any other node in the cluster set hashing the particular key. For example, upon receiving a write operation including a key, the node determines a cluster to write to by hashing the key to produce a token and selecting a cluster based on the token and an attoshard. Similarly, upon receiving a read operation including a key, the node determines a cluster to read from by hashing the key to produce a token and selecting a cluster based on the token and an attoshard. An attoshard is a segment of key space of size, in keys, proportional to the total number of nodes in the database. The attoshard includes a set of cluster segments, each cluster segment including a number of keys proportional to the number of nodes in a cluster in the set of clusters.

The client device 110 and the database application 115 are configured to communicate via the network 130, which may comprise any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

Figure 2:
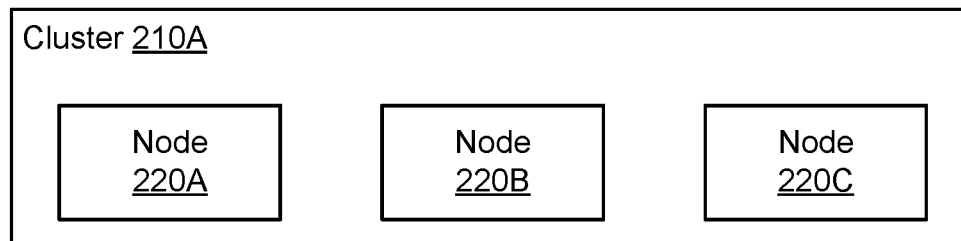
FIG. 2 is a block diagram illustrating a distributed database, according to one embodiment.
Figure 2:
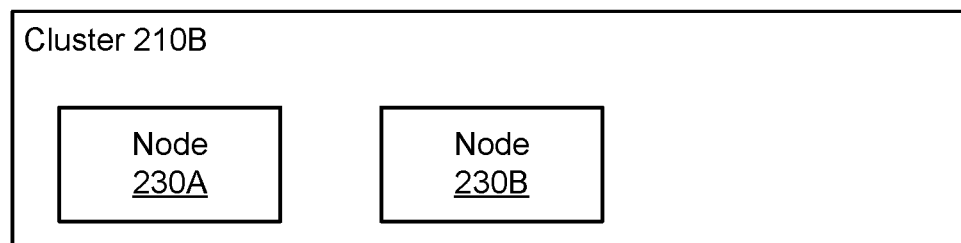
Figure 2:
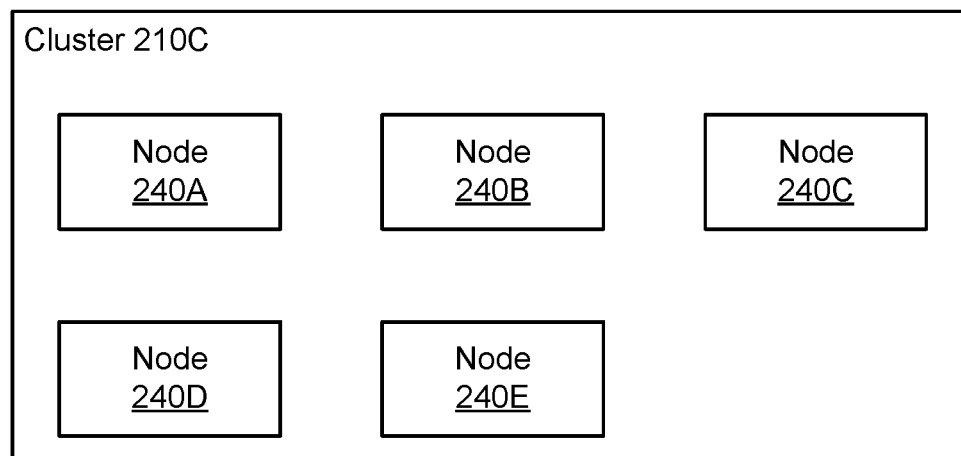

FIG. 2 uses like reference numerals to identify like elements. A letter after a reference numeral, such as "220A," indicates that the text refers specifically to the element having that particular reference numeral. A reference numeral in the text without a following letter, such as "220," refers to any or all of the elements in the figures bearing that reference numeral. For example, "220" in the text refers to reference numerals "220A," "220B," and/or "220C" in the figures.

FIG. 2 is a block diagram illustrating a distributed database, according to one embodiment. The distributed database is implemented by the cluster set 120. The cluster set 120 includes clusters 210A-C. Cluster 210A includes nodes 220A-C, cluster 210B includes nodes 230A-B, and cluster 210C includes nodes 240A-E. As such, cluster 210A includes 3 nodes, cluster 210B includes 2 nodes, and cluster 210C includes 5 nodes, and the cluster set 120 includes 10 nodes overall. The nodes in each cluster 210 are independent computing devices that are interconnected, e.g., over the network 130. For example, a node in a cluster 210 may be a hardware server device.

The distributed database maintains records of current and past cluster set 120 configurations, as well as respective times of operation. For example, a first configuration of the cluster set 120 may have only one node 220 in cluster 210A and operate from a first day to a second day, then a second configuration of the cluster set 120 includes the illustrated three nodes 220 in cluster 210A from the second day to the present day. Due to the differing numbers of nodes in cluster 210A, the first and second cluster set 120 configurations correspond to different attoshards, and therefore distribute tokens differently among the clusters in the cluster set 120.

When executing a write operation, the database application 115 records the time of the write operation at the distributed database in association with the key of the data in the write operation. When executing a read operation, the database application 115 checks the time of last write for the key of the data to be read, then determines a matching configuration of the cluster set 120 (e.g., a configuration of the cluster set 120 in operation during the time of last write). The database application 115 uses an attoshard for the matching configuration to determine the cluster from which to read.

The database application 115 may generate a new attoshard when the configuration of the cluster set 120 changes. For example, the cluster set 120 may be changed by an administrator to include more or fewer nodes in one or more clusters, and/or more or fewer clusters in the cluster set 120. The database application 115 generates the new attoshard based on the new size of the cluster set 120, e.g., to include a new number of keys proportional to a new number of nodes in the cluster set 120 and/or to include a new number of cluster segments corresponding to a new number of clusters in the cluster set 120.

III. Attosharding

Figure 3A:
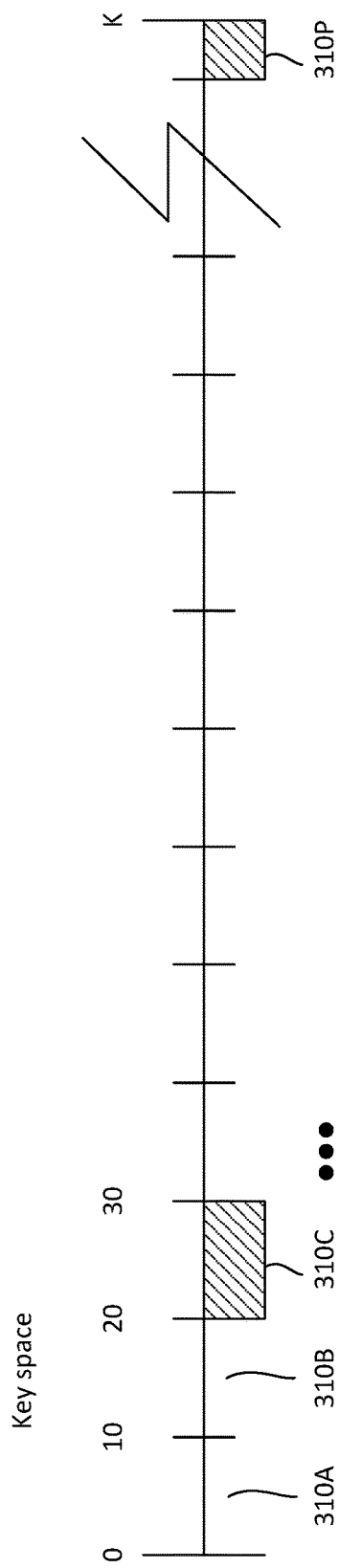
FIG. 3A illustrates a key space divided into attoshards, according to one embodiment.

FIG. 3A illustrates a key space divided into attoshards, according to one embodiment. The key space is a set of integers ranging from 0 to K. The key space is divided into attoshards 310 each including a disjoint subset of the key space. Attoshards 310A-C are full attoshards, including one key for each node in the cluster set overall. Attoshard 310P is a partial attoshard. If the number of nodes in the cluster set is a power of two, the partial attoshard 310P is a full attoshard. Otherwise, the partial attoshard 310P has fewer keys than there are nodes in the cluster set. The keys in the partial attoshard 310P are divided into cluster segments similar to full attoshards up until the end of the key space range, at which point it cuts off. While this leaves the ratios of keys to clusters slightly disproportionate, in practice the size of the one partial attoshard has negligible impact on the behavior of the system 100 due to K being a large integer (e.g., $2^{64}$), as is standard in many embodiments. Due to K being much greater than the number of nodes in the cluster set, the number of full attoshards will significantly outnumber the partial attoshard. As such, the key space remains finely and effectively proportionately distributed among the clusters despite the presence of the partial attoshard 310P.

As a particular example, a key space of $2^{64}$ keys is divided among attoshards for a cluster set having 544 nodes. In this embodiment there are 33,909,456,017,848,440 attoshards and one partial attoshard. As such, the keys of the partial attoshard have little significance to the overall ratios of keys to clusters in the cluster set; the distribution of keys is effectively proportional to the relative sizes of the clusters in the cluster set.

Figure 3B:
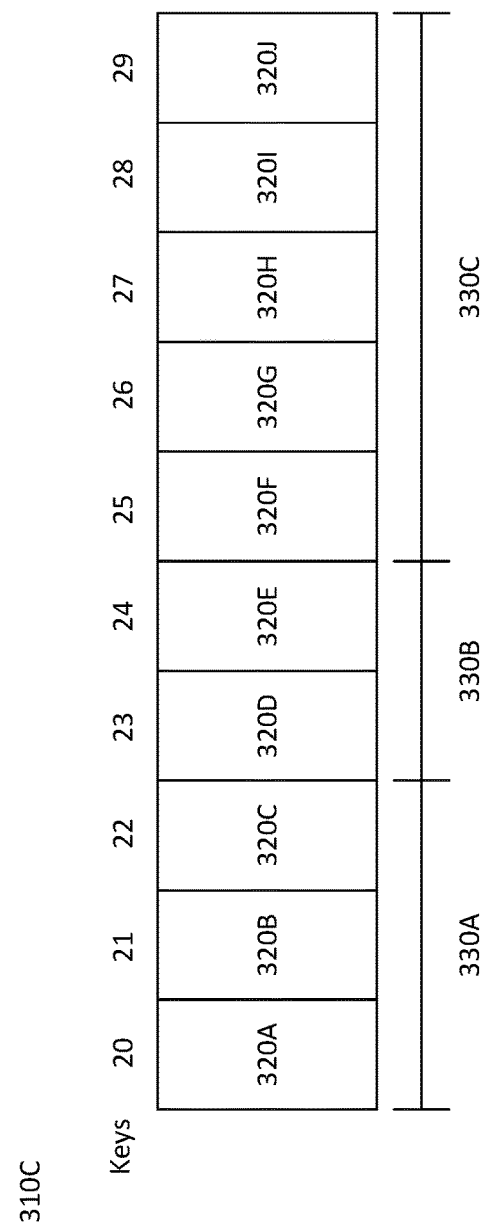
FIG. 3B illustrates cluster partitions within the range of an attoshard, according to one embodiment.

FIG. 3B illustrates cluster partitions within the range of attoshard 310C, according to one embodiment. As discussed above, each full attoshard, e.g. attoshard 310C, in the key space has a cluster segment 330 for each cluster in the cluster set. The order of assignment of cluster segments 330 within attoshards is consistent across all attoshards. Attoshard 310A has cluster segments 330A-C, which correspond to clusters 210A-C, respectively. Cluster segment 330A has three keys, 320A-C, one for each node in cluster 210A; cluster segment 330B has two keys, 320D-E, one for each node in cluster 210B; and cluster segment 330C has five keys, 320F-J, one for each node in cluster 210C. Cluster segments of the same size and in the same order occur in all full attoshards 310, and in the partial attoshard 310P up to the end of the key space, at which point it cuts off. For example, Attoshard 310A will have a similar composition to attoshard 310C, but with different keys. In contrast, if the partial attoshard is just six keys in size, it will have a full cluster segment 330A corresponding to cluster 210A and a full cluster segment 330B corresponding to cluster 210B, but a cluster segment of only one key corresponding to cluster 210C.

IV. Processes

Figure 4:
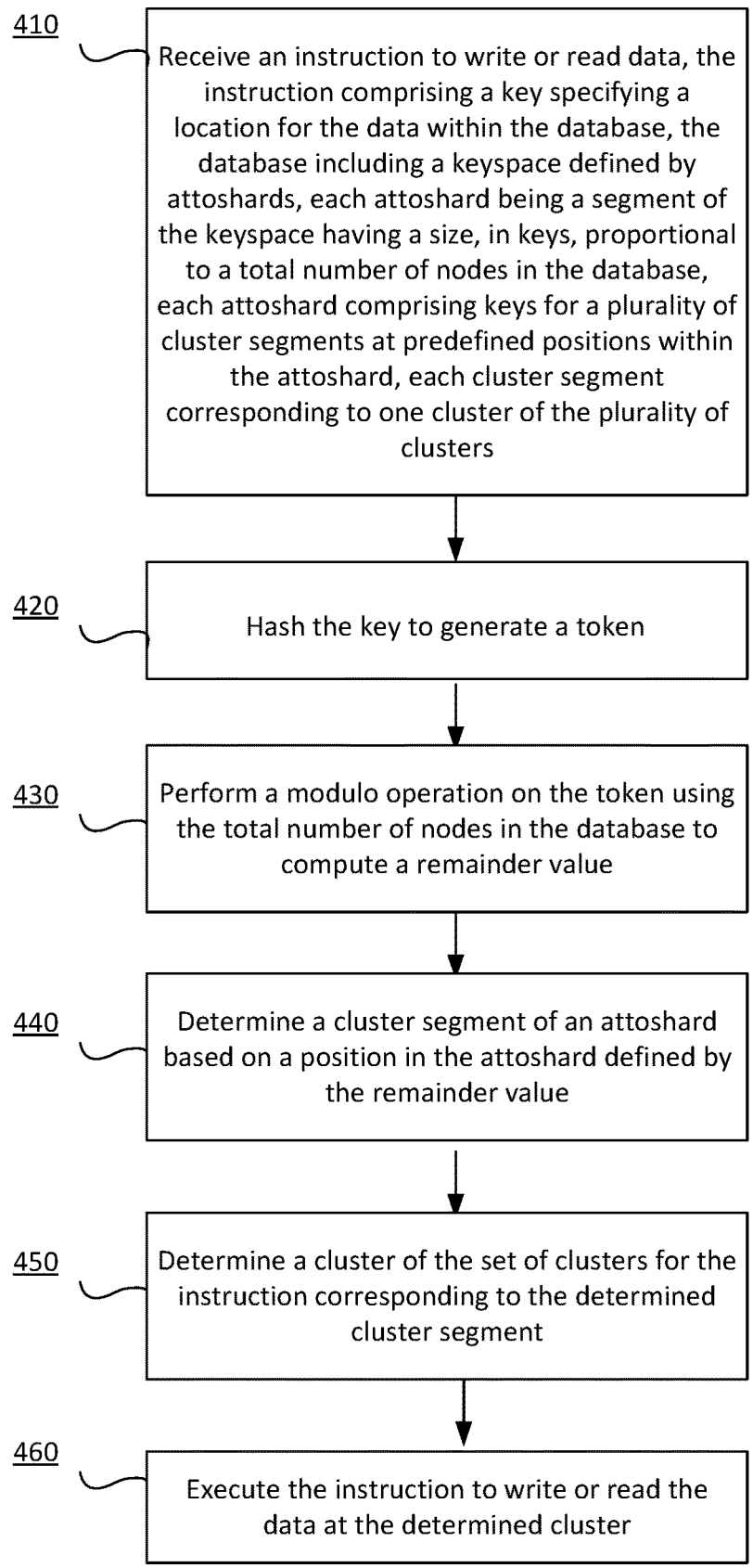
FIG. 4 illustrates a process for optimizing data access in a distributed database, according to one embodiment.

FIG. 4 illustrates a process for optimizing data access in a distributed database, according to one embodiment. The distributed database includes a cluster set of multiple clusters of nodes that host the distributed database. A particular node of a system including the distributed database receives 410 an instruction to read or write data. The instruction includes a key, e.g., a primary key, specifying the requested data. The instruction is received from a client device 110. The database includes a key space defined by attoshards, each attoshard being a segment of the key space having a size, in keys, proportional to a total number of nodes in the database, each attoshard comprising keys for a plurality of cluster segments at predefined positions within the attoshard, and each cluster segment corresponding to one cluster of the plurality of clusters.

The particular node determines 420 a token for the instruction based on the key and a hash partitioner. The hash partitioner is the hash function for consistent hashing common to each node in the cluster set. The particular node applies the hash partitioner to the key to produce a token.

The particular node determines one certain cluster from the cluster set to which to send the instruction based on the determined token and an attoshard of the database. As mentioned above, the attoshard is a consecutive segment of key space of size, in keys, proportional to the total number of nodes in the database. For example, the attoshard may include a number of keys equal to the number of nodes in the cluster set, or it may include a number of keys equal to twice the number of nodes in the cluster set. The attoshard includes a set of cluster segments, each cluster segment including a number of keys proportional to the number of nodes in a cluster in the set of clusters. Each cluster segment is a portion of the attoshard proportional to the overall size of the attoshard according to a ratio of nodes in the cluster corresponding to the cluster segment to the total number of nodes in the database. For example, as described with respect to FIG. 3, the attoshard may have a first cluster segment of two keys that corresponds to a cluster of two nodes, a second cluster segment of three keys that corresponds to a cluster of three nodes, and a third cluster segment of five keys that corresponds to a cluster of five nodes.

In an embodiment, rather than an equal number of keys as nodes in the cluster set, the attoshard includes a multiple of the number of nodes in the cluster set, such as twice as many. As such, a first cluster segment corresponding to a cluster of two nodes may include four keys, a second cluster segment corresponding to a cluster of three nodes may include six keys, and so on.

In a first embodiment, the distributed database stores all the attoshards, and using the token and an attoshard to determine the certain cluster involves identifying the attoshard including the token and identifying the cluster segment that includes the token. The particular node identifies the cluster associated with the cluster segment as the certain cluster.

In a second embodiment, the distributed database stores one attoshard for the current configuration of the cluster set. The particular node determines the certain cluster by mapping the token $\tau$ onto its first attoshard equivalent $\varphi$ using a modulo operation of the total number of nodes in the cluster set, N:

$$\varphi = \tau \bmod N$$

The cluster segment that includes $\varphi$ corresponds to the same cluster as the cluster segment that includes $\tau$. This is because the attoshards are structured equivalently, so a certain number of keys into a first attoshard reaches the same cluster segment as that number of steps into another attoshard. As such, the particular node identifies the cluster associated with the cluster segment including $\varphi$ as the certain cluster.

In particular, the particular node performs 430 the modulo operation upon the token using the total number of nodes in the database to compute a remainder value. The particular node advances the remainder value number of keys into the attoshard to identify a particular key. The initial key in the attoshard corresponds to a remainder value of zero, a next key in the attoshard corresponds to a remainder value of one, and so on. The particular node identifies 440 the cluster segment that includes the particular key, and identifies 450 the cluster corresponding to the particular cluster segment.

The particular node executes 460 the instruction at the determined cluster. For example, the particular node sends the instruction to the certain cluster.

The attoshard is used to determine the cluster to send the instruction to. However, the certain cluster has its own token ring, as does each cluster in the cluster set. Upon receiving the instruction, the certain cluster (e.g., a first node of the certain cluster) checks the token against its token ring to determine a node in the cluster that has the requested data. The first node sends the instruction to the determined node to retrieve the data, then sends the retrieved data back to the particular node.

V. Computing Components

Figure 5:
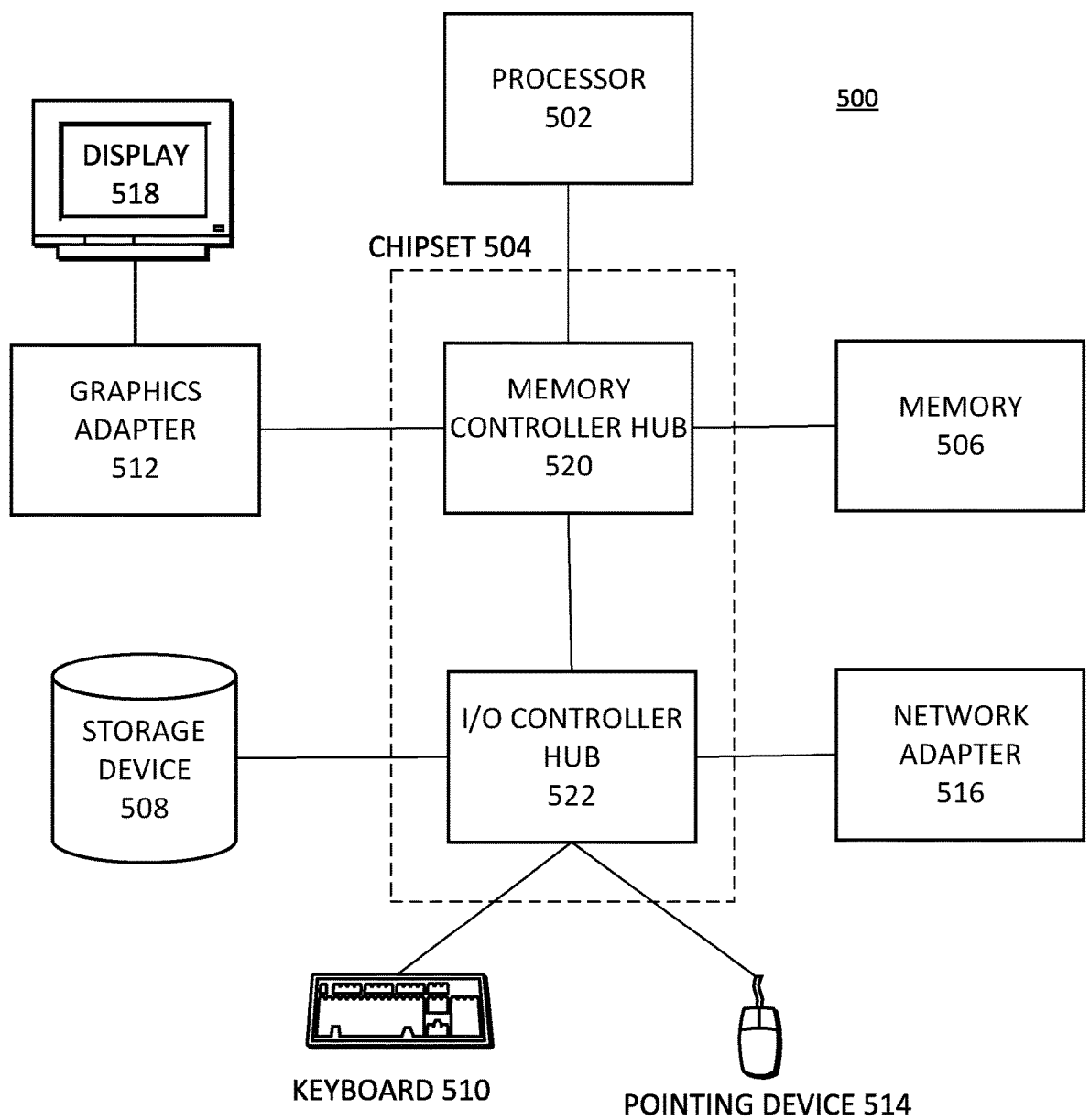
FIG. 5 is a block diagram illustrating physical components of a computer, according to one embodiment.

FIG. 5 is a high-level block diagram illustrating physical components of a computer 500 used as part or all of the client device 50, node 122, monitoring server 130, or end device 150, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a graphics adapter 512, and/or display 518, as well as a keyboard 510 or pointing device. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

VI. Additional Considerations

The disclosed cluster visualization techniques may provide several advantages over existing user interfaces, as described above. One of skill in the art may recognize additional advantages that may be realized using the described techniques.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-4. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process visualizing data using bubbles through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for querying a database distributed across a set of clusters, each cluster including a set of nodes, the computer-implemented method comprising, by a node:
    receiving an instruction to write or read data, the instruction comprising a key specifying a location for the data within the database, the database including a keyspace defined by attoshards, each attoshard being a segment of the keyspace having a size, in keys, proportional to a total number of nodes in the database, each attoshard comprising keys for a plurality of cluster segments at predefined positions within the attoshard, each cluster segment corresponding to one cluster of the plurality of clusters;
    hashing the key to generate a token;
    performing a modulo operation on the token using the total number of nodes in the database to compute a remainder value;
    determining a cluster segment of an attoshard based on a position in the attoshard defined by the remainder value;
    determining a cluster of the set of clusters for the instruction corresponding to the determined cluster segment; and
    executing the instruction to write or read the data at the determined cluster.

2. The computer-implemented method of claim 1, wherein each cluster segment is a portion of the attoshard proportional to the overall size of the attoshard according to a ratio of nodes in the cluster corresponding to the cluster segment to the total number of nodes in the database.

3. The computer-implemented method of claim 1, wherein executing the instruction to write or read the data at the determined cluster comprises:
    identifying a specific node from the set of nodes of the determined cluster by evaluating the token using a token ring of the determined cluster; and
    executing the instruction at the specific node of the determined cluster.

4. The computer-implemented method of claim 1, further comprising identifying the attoshard as corresponding to a current configuration of the database based on:
    determining a matching database configuration of a set of database configurations based on a time of last write for the key, wherein each database configuration corresponds to a time range; and
    retrieving the attoshard corresponding to the matching configuration.

5. The computer-implemented method of claim 4, further comprising:
    detecting a change in size of the database, the change in size of the database comprising at least one of a change in a number of nodes in a cluster and a change in a number of clusters in the cluster set;
    generating a new attoshard corresponding to the change in size, wherein the new attoshard comprises at least one of a new size in keys and a new number of cluster segments;
    receiving a second instruction to read or write data; and
    using the attoshard to identify a cluster to which to send the second instruction.

6. The computer-implemented method of claim 1, wherein sending the instruction to the determined cluster comprises sending the instruction exclusively to the determined cluster.

7. The computer-implemented method of claim 1, wherein determining a cluster segment of an attoshard based on a position in the attoshard defined by the remainder value comprises:
    advancing the remainder value number of keys into the attoshard to identify a particular key, wherein an initial key of the attoshard corresponds to a remainder value of zero; and
    identifying a particular cluster segment including the particular key.

8. The computer-implemented method of claim 1, wherein the instruction is a read instruction, and executing the instruction to read the data at the determined cluster further comprises:
    reading the data exclusively from the determined cluster.

9. A non-transitory computer-readable storage medium comprising computer program instructions executable by a processor to perform operations for querying a database distributed across a set of clusters, each cluster including a set of nodes, the operations comprising, by a node:
    receiving an instruction to write or read data, the instruction comprising a key specifying a location for the data within the database, the database including a keyspace defined by attoshards, each attoshard being a segment of the keyspace having a size, in keys, proportional to a total number of nodes in the database, each attoshard comprising keys for a plurality of cluster segments at predefined positions within the attoshard, each cluster segment corresponding to one cluster of the plurality of clusters;
    hashing the key to generate a token;
    performing a modulo operation on the token using the total number of nodes in the database to compute a remainder value;
    determining a cluster segment of an attoshard based on a position in the attoshard defined by the remainder value;
    determining a cluster of the set of clusters for the instruction corresponding to the determined cluster segment; and executing the instruction to write or read the data at the determined cluster.

10. The non-transitory computer-readable storage medium of claim 9, wherein each cluster segment is a portion of the attoshard proportional to the overall size of the attoshard according to a ratio of nodes in the cluster corresponding to the cluster segment to the total number of nodes in the database.

11. The non-transitory computer-readable storage medium of claim 9, wherein executing the instruction to write or read the data at the determined cluster comprises:
identifying a specific node from the set of nodes of the determined cluster by evaluating the token using a token ring of the determined cluster; and
executing the instruction at the specific node of the determined cluster.

12. The non-transitory computer-readable storage medium of claim 9, the operations further comprising identifying the attoshard as corresponding to a current configuration of the database based on:
determining a matching database configuration of a set of database configurations based on a time of last write for the key, wherein each database configuration corresponds to a time range; and
retrieving the attoshard corresponding to the matching configuration.

13. The non-transitory computer-readable storage medium of claim 12, the operations further comprising:
detecting a change in size of the database, the change in size of the database comprising at least one of a change in a number of nodes in a cluster and a change in a number of clusters in the cluster set;
generating a new attoshard corresponding to the change in size, wherein the new attoshard comprises at least one of a new size in keys and a new number of cluster segments;
receiving a second instruction to read or write data; and
using the attoshard to identify a cluster to which to send the second instruction.

14. The non-transitory computer-readable storage medium of claim 9, wherein sending the instruction to the determined cluster comprises sending the instruction exclusively to the determined cluster.

15. The non-transitory computer-readable storage medium of claim 9, wherein determining a cluster segment of an attoshard based on a position in the attoshard defined by the remainder value comprises:
advancing the remainder value number of keys into the attoshard to identify a particular key, wherein an initial key of the attoshard corresponds to a remainder value of zero; and
identifying a particular cluster segment including the particular key.

16. The non-transitory computer-readable storage medium of claim 9, wherein the instruction is a read instruction, and executing the instruction to read the data at the determined cluster further comprises:
reading the data exclusively from the determined cluster.

17. A system, comprising:
a processor; and
a non-transitory computer-readable storage medium comprising computer program instructions executable by the processor to perform operations for querying a database distributed across a set of clusters, each cluster including a set of nodes, the operations comprising, by a node:
receiving an instruction to write or read data, the instruction comprising a key specifying a location for the data within the database, the database including a keyspace defined by attoshards, each attoshard being a segment of the keyspace having a size, in keys, proportional to a total number of nodes in the database, each attoshard comprising keys for a plurality of cluster segments at predefined positions within the attoshard, each cluster segment corresponding to one cluster of the plurality of clusters;
hashing the key to generate a token;
performing a modulo operation on the token using the total number of nodes in the database to compute a remainder value;
determining a cluster segment of an attoshard based on a position in the attoshard defined by the remainder value;
determining a cluster of the set of clusters for the instruction corresponding to the determined cluster segment; and
executing the instruction to write or read the data at the determined cluster.

18. The system of claim 17, wherein executing the instruction to write or read the data at the determined cluster comprises:
identifying a specific node from the set of nodes of the determined cluster by evaluating the token using a token ring of the determined cluster; and
executing the instruction at the specific node of the determined cluster.

19. The system of claim 17, the operations further comprising identifying the attoshard as corresponding to a current configuration of the database based on:
determining a matching database configuration of a set of database configurations based on a time of last write for the key, wherein each database configuration corresponds to a time range; and
retrieving the attoshard corresponding to the matching configuration.

20. The system of claim 17, wherein determining a cluster segment of an attoshard based on a position in the attoshard defined by the remainder value comprises:
advancing the remainder value number of keys into the attoshard to identify a particular key, wherein an initial key of the attoshard corresponds to a remainder value of zero; and
identifying a particular cluster segment including the particular key.

* * * * *